(12) United States Patent
Ie et al.

(10) Patent No.: US 11,518,885 B1
(45) Date of Patent: Dec. 6, 2022

(54) ASPHALT COMPOSITION

(71) Applicant: KAO CORPORATION, Tokyo (JP)

(72) Inventors: Machiko Ie, High Point, NC (US); Andrew Dike Hughes, High Point, NC (US)

(73) Assignee: KAO CORPORATION, Tokyo (JP)

( * ) Notice: Subject to any disclaimer, the term of this patent is extended or adjusted under 35 U.S.C. 154(b) by 16 days.

(21) Appl. No.: 17/242,414

(22) Filed: Apr. 28, 2021

(51) Int. Cl.
*C08L 95/00* (2006.01)

(52) U.S. Cl.
CPC .................................. *C08L 95/00* (2013.01)

(58) Field of Classification Search
CPC ........................................................ C08L 95/00
See application file for complete search history.

(56) References Cited

U.S. PATENT DOCUMENTS

| 10,662,110 | B2 | 5/2020 | Shirai |
| 2013/0289686 | A1 | 10/2013 | Masson et al. |
| 2014/0338565 | A1 | 11/2014 | Severance et al. |
| 2015/0240081 | A1 | 8/2015 | Grady et al. |
| 2019/0135693 | A1 | 5/2019 | Shirai |
| 2019/0233647 | A1 | 8/2019 | Takahashi et al. |
| 2020/0181409 | A1* | 6/2020 | Bueno Perisé ......... C08L 95/00 |
| 2020/0224033 | A1* | 7/2020 | Hashimoto ............. C08L 67/02 |
| 2021/0147295 | A1* | 5/2021 | Fukuri .................... C04B 26/26 |
| 2021/0395529 | A1* | 12/2021 | Kakiuchi ............. C08G 63/183 |
| 2022/0127460 | A1* | 4/2022 | Akino .................... C08L 67/00 |

FOREIGN PATENT DOCUMENTS

| JP | 2018003580 A | 1/2018 |
| JP | 2018021185 A | 2/2018 |

* cited by examiner

*Primary Examiner* — Ellen M McAvoy
(74) *Attorney, Agent, or Firm* — Element IP, PLC

(57) ABSTRACT

The present invention relates to an asphalt composition containing asphalt and a polyester, the polyester containing a constitutional unit derived from an alcohol component containing 50% to 99% by mole of an aliphatic diol having 4 to 12 carbon atoms (A) and 1% to 50% by mole of an alkylene oxide adduct of bisphenol A (B), and a constitutional unit derived from a carboxylic acid component.

12 Claims, No Drawings

ASPHALT COMPOSITION

FIELD OF THE INVENTION

The present invention relates to an asphalt composition.

BACKGROUND OF THE INVENTION

For paving of automobile roads, car parking spaces, freight yards, sidewalks, and the like, asphalt pavement using an asphalt aggregate mixture has been preferred in part because the pavement can be conveniently laid, and the period of time from the start of pavement work to the start of transit service can be minimized. The asphalt pavement forms a road surface comprising an asphalt mixture having an aggregate bound by asphalt, hence providing the paved road with the favorable hardness and durability.

U.S. Pat. No. 10,662,110 (PTL 1) describes an asphalt composition for road pavement developing excellent dry strength, water immersion strength, and bending strength. The asphalt composition contains asphalt binder, a given amount of a polyester resin, and an aggregate, wherein the polyester resin has a constitutional unit derived from an alcohol component containing given amounts of an alkylene oxide adduct of bisphenol A, and a constitutional unit derived from a carboxylic acid component containing a given amount of one or more kind selected from fumaric acid, maleic acid, terephthalic acid, and isophthalic acid, and characterized by softening point, glass transition point, number average molecular weight, and acid value.

US 2019/0233647 A (PTL 2) describes an asphalt composition that has excellent storage stability at high temperature, wherein the asphalt composition contains asphalt, a polyester resin, and a dispersant.

SUMMARY OF THE INVENTION

The present invention relates to an asphalt composition containing asphalt and a polyester, Wherein the polyester contains a constitutional unit derived from an alcohol component containing 50% to 99% by mole of an aliphatic diol having 4 to 12 carbon atoms (A) and 1% to 50% by mole of an alkylene oxide adduct of bisphenol A (B), and a constitutional unit derived from a carboxylic acid component.

DETAILED DESCRIPTION OF THE INVENTION

In the asphalt composition for road pavement described in PTL 1, there are cases where in mixing the polyester with the asphalt, the homogeneity cannot be sustained after mixing due to the difference in specific gravity between the asphalt and the polyester, leading the polyester to settle at the bottom. As a result, the asphalt pavement shows variability in strength.

In the asphalt composition described in PTL 2, the addition of the dispersant to the asphalt composition reduces the dispersion diameter of the polyester, leading to the suppression of the polyester deposition from being formed in the asphalt, thereby enabling pavement without strength variability. However, in the case where the asphalt composition is stored at a high temperature for several hours, there are cases where the adsorption capability of the dispersant to the polyester is reduced, leading to the loss of the uniformity in strength of the asphalt pavement.

Several hours are often required from the production of an asphalt mixture in the plant, delivery on the pavement site (Transportation) and the laying down the asphalt mixture on the road. Accordingly, there is a demand for further improvement of the storage stability.

The present invention is to provide an asphalt composition that shows excellent storage stability, i.e., the polyester is uniformly dispersed in the asphalt even after storage for a long period of time at a high temperature.

[Asphalt Composition]

The asphalt composition of the present invention contains asphalt and a polyester, wherein the polyester contains a constitutional unit derived from an alcohol component containing 50% to 99% by mole of an aliphatic diol having 4 to 12 carbon atoms (A) and 1% to 50% by mole of an alkylene oxide adduct of bisphenol A (B), and a constitutional unit derived from a carboxylic acid component.

The present inventors have found that the problem can be solved by an asphalt composition containing asphalt and a polyester, in which the particular polyester is mixed therein.

The mechanism of action of the present invention is not clear, but may provisionally be described as follows.

It is considered that the constitutional unit derived from an aliphatic diol of the polyester contained in the asphalt composition of the present invention interacts with the low molecular weight component having an aliphatic alkyl structure in the asphalt to form a complex. It is considered that the complex retains the stability of the interface between the asphalt and the polyester, and a the polyester is less prone to separate from the asphalt.

It is also considered that the polyester forms a complex directly with the constitutional component of the asphalt, and therefore the stable state can be retained even after storage at a high temperature for a long period of time.

According to the present invention, an asphalt composition that shows excellent storage stability, i.e., the polyester is uniformly dispersed in the asphalt even after storage for a long period of time at a high temperature, can be achieved.

The definitions and the like of the terms used in the description herein will be shown below.

In the polyester, the "constitutional unit derived from an alcohol component" means a structure obtained by removing the hydrogen atom from the hydroxy group of the alcohol component, and the "constitutional unit derived from a carboxylic acid component" means a structure obtained by removing the hydroxy group from the carboxy group of the carboxylic acid component.

The "carboxylic acid component" means a concept that encompasses not only a carboxylic acid but also an anhydride and an alkyl ester of a carboxylic acid (for example, the alkyl group has 1 to 3 carbon atoms), which are capable of equivalent reactive coupling chemistry with hydroxyl groups. In the case where the carboxylic acid component is an alkyl ester, the number of carbon atoms of the alkyl group attached to the spa oxygen of the ester is not counted in the number of carbon atoms of the carboxylic acid.

<Asphalt>

The asphalt composition of the present invention contains asphalt.

The asphalt used may be various kinds of asphalt. Examples thereof include neat asphalt, which is petroleum asphalt for pavement, and modified asphalt.

The neat asphalt means a residual bituminous substance obtained by subjecting a crude oil to an atmospheric distillation equipment, a reduced-pressure distillation equipment, or the like.

Examples of the modified asphalt include blown asphalt; and a polymer-modified asphalt modified with a polymer material, such as a thermoplastic elastomer or a thermoplastic resin (which may be hereinafter referred to as a "polymer-modified asphalt"). The blown asphalt means asphalt obtained in such a manner that a mixture of straight asphalt and a heavy oil is heated and then oxidized by blowing air therein.

The asphalt is preferably selected from straight asphalt and polymer-modified asphalt, polymer-modified asphalt is more preferred from the standpoint of the durability of the asphalt pavement, and straight asphalt is more preferred from the standpoint of the general versatility.

(Thermoplastic Elastomer)

Examples of the thermoplastic elastomer in the polymer-modified asphalt include at least one kind selected from a styrene-butadiene block copolymer (which may be hereinafter referred to as "SB"), a styrene-butadiene-styrene block copolymer (which may be hereinafter referred to as "SBS"), a styrene-butadiene random copolymer (which may be hereinafter referred to as "SBR"), a styrene-isoprene block copolymer (which may be hereinafter referred to as "SI"), a styrene-isoprene-styrene block copolymer (which may be hereinafter referred to as "SIS"), a styrene-isoprene random copolymer (which may be hereinafter referred to as "SIR"), an ethylene-vinyl acetate copolymer, an ethylene-acrylate ester copolymer, a styrene-ethylene-butylene-styrene copolymer, a styrene-ethylene-propylene-styrene copolymer, a polyurethane based thermoplastic elastomer, a polyolefin based thermoplastic elastomer, an isobutylene-isoprene copolymer, polyisoprene, polychloroprene, synthetic rubber other than these materials, and natural rubber.

Among these, the thermoplastic elastomer is preferably at least one kind selected from SB, SBS, SBR, SI, SIS, SIR, and an ethylene-acrylate ester copolymer, more preferably at least one kind selected from SB, SBS, SBR, SI, SIS, and SIR, and further preferably at least one kind selected from SBR and SBS, from the standpoint of the durability of the asphalt pavement.

The content of the thermoplastic elastomer in the polymer-modified asphalt is preferably 0.1% or more by mass, more preferably 0.5% or more by mass, and further preferably 1% or more by mass, and is preferably 30% or less by mass, more preferably 15% or less by mass, and further preferably 5% or less by mass, from the standpoint of durability of the asphalt pavement.

The content of asphaltene in the asphalt is preferably 13% or more by mass, more preferably 15% or more by mass, and further preferably 17% or more by mass, and is preferably 35% or less by mass, more preferably 27% or less by mass, and further preferably 24% or less by mass, from the standpoint of durability of the asphalt pavement.

The content of asphaltene in the asphalt is a value that is measured according to Japan Petroleum Institute Standard JPI-55-22-83 "Compositional Analysis Method of Asphaltene by Column Chromatography".

The total content of the neat asphalt and the polymer-modified asphalt in the asphalt composition is preferably 60% or more by mass, more preferably 65% or more by mass, and further preferably 70% or more by mass, from the standpoint of maximization of the asphalt performance capability, and is preferably 99.5% or less by mass, more preferably 99% or less by mass, and further preferably 98% or less by mass, from the standpoint of the storage stability.

<Polyester>

The asphalt composition of the present invention contains a polyester, wherein the polyester may be used alone or as a combination of two or more kinds thereof.

The polyester contains a constitutional unit derived from an alcohol component containing 50% or more by mole and 99% or less by mole of an aliphatic diol having 4 or more and 12 or less carbon atoms (A) and 1% or more by mole and 50% or less by mole of an alkylene oxide adduct of bisphenol A (B), and a constitutional unit derived from a carboxylic acid component, from the standpoint of the storage stability.

The alcohol component, the carboxylic acid component, the properties of the polyester, and the like will be described below.

(Alcohol Component)

The number of carbon atoms of the aliphatic diol having 4 to 12 carbon atoms (A) (which may be hereinafter referred to as the "aliphatic diol (A)") is preferably 5 or more, and more preferably 6 or more, and is preferably 10 or less, and more preferably 8 or less, from the standpoint of the storage stability.

Examples of the aliphatic diol (A) include 1,4-butanediol, 1,5-pentanediol, 1,6-hexanediol, 1,4-butenediol, 1,3-butanediol, neopentyl glycol, 1,10-decanediol, and 1,12-dodecanediol, and 1,6-hexanediol is preferred. The aliphatic diol (A) may be used alone or in combination with two or more kinds thereof.

The content of the aliphatic diol (A) in the alcohol component is 50% or more by mole, preferably more than 50% by mol, more preferably 52% or more by mole, and further preferably 55% or more by mole, and is 99% or less by mole, preferably 95% or less by mole, more preferably 85% or less by mole, and further preferably 70% or less by mole, based on 100% by mole of the alcohol component, from the standpoint of the storage stability.

Examples of the alkylene oxide adduct of bisphenol A (B) include an alkylene oxide adduct of bisphenol A represented by the following formula (I).

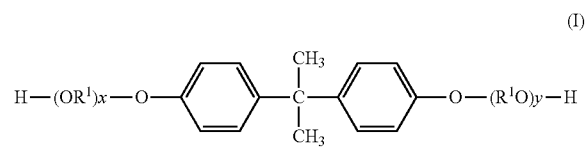

(I)

In the formula (I), OR$^1$ and R$^{10}$ each represent an alkylene oxide; R$^1$ represents an alkylene group having 2 or 3 carbon atoms; and x and y each represent a positive number showing the average addition number of the alkylene oxide, provided that the sum of x and y is preferably 1 to 16, and more preferably 1.5 to 8, and further preferably 1.5 to 4.

Examples of the alkylene oxide adduct of bisphenol A represented by the formula (I) include a propylene oxide adduct of bisphenol A (2,2-bis(4-hydroxyphenyl)propane) and an ethylene oxide adduct of bisphenol A. The alkylene oxide adduct of bisphenol A (B) may be used alone or as a combination of two or more kinds thereof.

The content of the alkylene oxide adduct of bisphenol A (B) in the alcohol component is 1% or more by mole, preferably 5% or more by mole, more preferably 15% or more by mole, and further preferably 30% or more by mole, and is 50% or less by mole, preferably less than 50% by mol, more preferably 48% or less by mole, and further preferably 45% or less by mole, based on 100% by mole of the alcohol component, from the standpoint of the durability of the asphalt pavement.

The molar ratio of the aliphatic diol (A) and the alkylene oxide adduct of bisphenol A (B) ((A)/(B)) is preferably 1.2 or more, more preferably 1.3 or more, and further preferably 1.4 or more, and is preferably 9 or less, more preferably 5 or less, and further preferably 3 or less, from the standpoint of the storage stability.

The alcohol component may contain an alcohol component other than the aliphatic diol (A) and the alkylene oxide adduct of bisphenol A (B). Specific examples thereof include an aliphatic diol other than the aliphatic diol (A), an aromatic diol other than the alkylene oxide adduct of bisphenol A (B), and a trihydric or higher and octahydric or lower polyhydric alcohol. These alcohol components may be used alone or as a combination of two or more kinds thereof.

Examples of the trihydric or higher and octahydric or lower polyhydric alcohol include a trihydric alcohol, such as glycerin.

The alcohol component may further contain an aliphatic monoalcohol (C) from the standpoint of the storage stability.

The number of carbon atoms of the aliphatic monoalcohol (C) is preferably 12 or more, more preferably 14 or more, and further preferably 16 or more, and is preferably 22 or less, more preferably 21 or less, and further preferably 20 or less.

Examples of the aliphatic monoalcohol (C) include lauryl alcohol, myristyl alcohol, palmityl alcohol, stearyl alcohol, arachidyl alcohol, and docosanol, and stearyl alcohol is preferred.

In the case where the aliphatic alcohol (C) is contained, the content thereof is preferably 0.1% or more by mole, more preferably 1% or more by mole, and further preferably 5% or more by mole, and is preferably 20% or less by mole, more preferably 15% or less by mole, and further preferably 10% or less by mole, based on 100% by mole of the alcohol component.

Examples of the preferred embodiment of the polyester in the present invention include an embodiment where the alcohol component is constituted substantially only by the aliphatic diol (A) and the alkylene oxide adduct of bisphenol A (B).

(Carboxylic Acid Component)

Examples of the carboxylic acid component include an aliphatic dicarboxylic acid, an aromatic dicarboxylic acid, and a tribasic or higher and hexabasic or lower polybasic carboxylic acid. The carboxylic acid component may be used alone or as a combination of two or more kinds thereof.

The number of carbon atoms of the main chain of the aliphatic dicarboxylic acid is preferably 3 or more, and more preferably 4 or more, and is preferably 10 or less, and more preferably 6 or less, from the standpoint of the storage stability. The number of carbon atoms of the main chain of the aliphatic dicarboxylic acid includes carbon constituting the carboxy group.

The aliphatic dicarboxylic acid used may be any of a saturated aliphatic dicarboxylic acid and an unsaturated aliphatic dicarboxylic acid, and an unsaturated aliphatic dicarboxylic acid is preferred. The saturated aliphatic dicarboxylic acid is an aliphatic dicarboxylic acid having a main chain that has no unsaturated bond, and the unsaturated aliphatic dicarboxylic acid is an aliphatic dicarboxylic acid having a main chain that has an unsaturated bond.

Specific examples of the saturated aliphatic dicarboxylic acid include oxalic acid, malonic acid, glutaric acid, adipic acid, suberic acid, azelaic acid, sebacic acid, and dodecanedioic acid. Specific examples of the unsaturated aliphatic dicarboxylic acid include fumaric acid, maleic acid, citraconic acid, itaconic acid, and glutaconic acid. The aliphatic dicarboxylic acid also encompasses succinic acid substituted by an alkyl group having 1 or more and 20 or less carbon atoms or an alkenyl group having 2 or more and 20 or less carbon atoms, such as dodecylsuccinic acid, dodecenylsuccinic acid, and octenylsuccinic acid.

Examples of the aromatic dicarboxylic acid include terephthalic acid, phthalic acid, isophthalic acid, and naphthalene dicarboxylic acid. Among these, one or more kind selected from terephthalic acid and isophthalic acid is preferred, and terephthalic acid is more preferred.

Examples of the tribasic or higher and hexabasic or lower polybasic carboxylic acid include a tribasic carboxylic acid, such as trimellitic acid, 2,5,7-naphthalenetricarboxylic acid, and pyromellitic acid.

The carboxylic acid component preferably contains one or more kind selected from fumaric acid and maleic acid, more preferably contains fumaric acid, from the standpoint of the storage stability.

The total content of the one or more kind selected from fumaric acid and maleic acid in the carboxylic acid component is preferably 10% or more by mole, more preferably 40% or more by mole, and further preferably 80% or more by mole, and is preferably 100% or less by mole, and more preferably 95% or less by mole, based on 100% by mole of the carboxylic acid component.

The carboxylic acid component may further contain an aliphatic monocarboxylic acid (D).

The number of carbon atoms of the aliphatic monocarboxylic acid (D) is preferably 12 or more, more preferably 14 or more, and further preferably 16 or more, and is preferably 22 or less, more preferably 21 or less and further preferably 20 or less.

Examples of the aliphatic monocarboxylic acid (D) include a saturated aliphatic monocarboxylic acid and an unsaturated aliphatic monocarboxylic acid, and a saturated aliphatic monocarboxylic acid is preferred. Examples of the saturated aliphatic monocarboxylic acid include lauric acid, myristic acid, palmitic acid, stearic acid, arachidic acid, and behenic acid, and stearic acid is preferred. Examples of the unsaturated aliphatic monocarboxylic acid include oleic acid, linoleic acid, and linolenic acid.

In the case where the carboxylic acid contains the aliphatic monocarboxylic acid (D), the content thereof is preferably 0.1% or more by mole, more preferably 1% or more by mole, and further preferably 5% or more by mole, and is preferably 20% or less by mole, more preferably 15% or less by mole, and further preferably 10% or less by mole, based on 100% by mole of the carboxylic acid component.

The alcohol component and the carboxylic acid component may contain one or more kind selected from the aliphatic monoalcohol (C) and the aliphatic monocarboxylic acid (D) described above. In this case, it is preferred that any one of the aliphatic monoalcohol (C) and the aliphatic monocarboxylic acid (D) is contained, and it is more preferred that the aliphatic monocarboxylic acid (D) is contained.

Examples of the preferred embodiment of the polyester in the present invention include an embodiment where the carboxylic acid component is constituted substantially only by the aliphatic dicarboxylic acid, and an embodiment where he carboxylic acid component is constituted substantially only by the aliphatic dicarboxylic acid and the aliphatic monocarboxylic acid.

(Molar Ratio of Carboxylic Acid Component to Alcohol Component)

The equivalent ratio of the carboxy group of the carboxylic acid component to the hydroxy group of the alcohol component (COOH group/OH group) is preferably 0.6 or more, more preferably 0.7 or more, and further preferably 0.8 or more, and is preferably 1.3 or less, more preferably 1.2 or less, and further preferably 1.1 or less, from the standpoint of the durability of the asphalt pavement.

The polyester in the present invention may be a polyester that is modified to such an extent that substantially does not impair the characteristics thereof. Specific examples of the modified polyester include a polyester modified to be a graft or block polymer with phenol, urethane, epoxy, or the like, according to the methods described in JP 11-133668 A, JP 10-239903 A, and JP 8-20636 A. Preferred examples of the modified polyester include a urethane-modified polyester obtained through urethane elongation with a polyisocyanate compound.

(Properties of Polyester)

The acid value of the polyester is preferably is preferably 3 mg KOH/g or higher, more preferably 8 mg KOH/g or higher, and further preferably 10 mg KOH/g or higher, and is preferably 60 mg KOH/g or higher, more preferably 40 mg KOH/g or higher, and further preferably 30 mg KOH/g or higher, from the standpoint of the storage stability.

The hydroxyl value of the polyester is preferably 10 mg KOH/g or higher, more preferably 12 mg KOH/g or higher, and further preferably 15 mg KOH/g or higher, and is preferably 50 mg KOH/g or lower, more preferably 40 mg KOH/g or lower, and further preferably 30 mg KOH/g or lower, from the same standpoint.

The number average molecular weight of the polyester is preferably 1,500 or higher, more preferably 2,000 or higher, and further preferably 2,300 or higher, and is preferably 8,000 or lower, more preferably 3,000 or lower, further preferably lower than 3,000, and still further preferably 2,900 or lower, from the same standpoint.

The weight average molecular weight of the polyester is preferably 5,000 or higher, more preferably 6,000 or higher, and further preferably 7,000 or higher, and is preferably 60,000 or lower, more preferably 10,000 or lower, and further preferably 9,000 or lower, from the same standpoint.

The peak top molecular weight of the polyester is preferably 4,000 or higher, more preferably 4,500 or higher and further preferably 5,000 or higher, and is preferably 25,000 or lower, more preferably 9,000 or lower, and further preferably 8,000 or lower, from the same standpoint.

The polydispersity (Mw/Mn) of the polyester is preferably 2.5 or higher, and more preferably 2.9 or higher, and is preferably 8.5 or lower, more preferably 8.0 or lower, and further preferably 4.0 or lower, from the same standpoint.

The acid value, the hydroxyl value, the number average molecular weight, the weight average molecular weight, the peak top molecular weight, and the polydispersity may be measured by the methods described in the examples. The acid value, the hydroxyl value, the number average molecular weight, the weight average molecular weight, the peak top molecular weight, and the polydispersity can be controlled by the composition of the raw material monomers, the amount of the catalyst, the reaction conditions, and the like.

(Production Method of Polyester)

The production method of the polyester is not particularly limited. For example, the polyester may be produced through polycondensation of the alcohol component and the carboxylic acid component.

The amounts of the alcohol component and the carboxylic acid component mixed may be such amounts that provide a molar ratio of the constitutional unit derived from the carboxylic acid component to the constitutional unit derived from the alcohol component (carboxylic acid component/alcohol component) within the aforementioned numeral range.

The temperature of the polycondensation reaction is not particularly limited, and is preferably 160° C. or higher, more preferably 190° C. or higher, and further preferably 200° C. or higher, and is preferably 260° C. or lower, more preferably 250° C. or lower, and further preferably 240° C. or lower, from the standpoint of the reactivity. The polycondensation may be performed in an inert gas atmosphere.

In the polycondensation reaction, a tin(II) compound having no Sn—C bond, such as tin(II) di(2-ethylhexanoate), may be used as an esterification catalyst, from the standpoint of the reaction rate. The amount of the esterification catalyst used is preferably 0.01 part by mass or more, more preferably 0.1 or more parts by mass, and further preferably 0.2 or more parts by mass, and is preferably 1.5 or less parts by mass, more preferably 1.0 or less parts by mass, and further preferably 0.6 or less parts by mass, per 100 parts by mass in total of the alcohol component and the carboxylic acid component.

In the polycondensation reaction, a pyrogallol compound, such as gallic acid, may be used as a promoter from the standpoint of the reaction rate, in addition to the esterification catalyst. The amount of the promoter used is preferably 0.001 or more parts by mass, more preferably 0.005 or more parts by mass, and further preferably 0.01 or more parts by mass, and is preferably 0.15 or less parts by mass, more preferably 0.10 or less parts by mass, and further preferably 0.08 or less parts by mass, per 100 parts by mass in total of the alcohol component and the carboxylic acid component.

In the polycondensation reaction, a polymerization inhibitor, such as 4-tert-butylcatechol, may be used in addition to the catalyst. The amount of the polymerization inhibitor used is preferably 0.001 or more parts by mass, and more preferably 0.01 or more parts by mass, and is preferably 0.10 or less parts by mass, and more preferably 0.05 or less parts by mass, per 100 parts by mass in total of the alcohol component and the carboxylic acid component.

(Content of Polyester)

The content of the polyester in the asphalt composition is preferably 0.5 or more parts by mass, more preferably 1 or more parts by mass, further preferably 2 or more parts by mass, and still further preferably 4 or more parts by mass, and is preferably 15 or less parts by mass, more preferably 12 or less parts by mass, further preferably 10 or less parts by mass, and still further preferably 8 or less parts by mass, per 100 parts by mass of the asphalt, from the standpoint of the durability of the asphalt pavement and the storage stability.

<Dispersant>

The asphalt composition may further contain a dispersant.

Examples of the dispersant include a polymeric dispersants, such as a polyamidoamine and a salt thereof, a polycarboxylic acid and a salt thereof, a high molecular weight unsaturated acid ester, a modified polyurethane, a modified polyester, a modified poly(meth)acrylate, a (meth) acrylic based polymer, and a naphthalene sulfonic acid-formalin condensate. The "polymer dispersant" referred in the present invention means a dispersant having a weight average molecular weight of at least 1,000.

The content of the dispersant is preferably less than 1 part by mass, and more preferably less than 0.5 part by mass, per 100 parts by mass of the polyester, and it is further preferred that the dispersant is not present, from the standpoint of storage stability.

[Production Method of Asphalt Composition]

The asphalt composition of the present invention may be produced by mixing the asphalt and the polyester. Specifically, the asphalt composition may be obtained in such a manner that the asphalt is melted under heating, to which the polyester is added, and the components are mixed by mixing with a standard mixer until the polyester is uniformly dispersed in the asphalt.

Examples of standard mixers include a homogenizer, a dissolver, a paddle mixer, a ribbon mixer, a screw mixer, a planetary mixer, a vacuum counterflow mixer, a roll mill, and a twin screw extruder.

The mixing temperature of the asphalt and the polyester is preferably 140° C. or higher, more preferably 150° C. or higher, and further preferably 160° C. or higher, and is preferably 230° C. or lower, more preferably 210° C. or lower, and further preferably 200° C. or lower, from the standpoint of the uniform dispersion of the polyester in the asphalt.

The mixing time of the asphalt and the polyester is preferably 15 minutes or more, more preferably 30 minutes or more, and further preferably 1 hour or more, and is preferably 10 hours or less, more preferably 5 hours or less, and further preferably 3 hours or less, from the standpoint of the uniform dispersion of the polyester in the asphalt.

The asphalt composition of the present invention is a binder composition, and for example, can be used for pavement in the form of an asphalt mixture by adding an aggregate thereto. Accordingly, the asphalt composition of the present invention is favorable for surface pavement, and particularly favorable for road pavement.

[Asphalt Mixture]

An asphalt mixture as a preferred use example of the asphalt composition will be described.

The asphalt mixture contains an aggregate and the asphalt composition. Accordingly, the asphalt mixture contains at least an aggregate, the asphalt, and the polyester.

<Aggregate>

The aggregate used may be arbitrarily selected, for example, from crushed stone, cobbled stone, ballast, sand, a recycled aggregate, and ceramics. The aggregate used may be any coarse aggregate having a particle diameter of 2.36 mm or larger and any fine aggregate having a particle diameter of less than 2.36 mm, and it is preferred that a coarse aggregate and a fine aggregate are used in combination.

The content of the aggregate in the asphalt mixture is preferably 85% or more by mass, more preferably 90% or more by mass, and further preferably 92% or more by mass, and is preferably 98% or less by mass, more preferably 97% or less by mass, and further preferably 96% or less by mass, from the standpoint of the durability of the asphalt pavement.

<Additive>

Various additives that have been commonly used in asphalt mixtures, such as a film forming agent, a thickening stabilizer, and an emulsifier, may be added to the asphalt mixture, in addition to the aggregate, the asphalt, and the polyester described above.

The total content of the additives is preferably 50% or less by mass, more preferably 25% or less by mass, and further preferably 5% or less by mass, in the asphalt mixture.

[Production Method of Asphalt Mixture]

The production method of the asphalt mixture is not particularly limited, and the asphalt mixture may be produced any production method. In general, the asphalt mixture may be produced according to a production method of an asphalt mixture containing an aggregate and asphalt. Specific examples thereof include a method of adding and mixing the asphalt composition in the heated aggregate.

The temperature of the heated aggregate is preferably 130° C. or higher, more preferably 150° C. or higher, and further preferably 170° C. or higher, from the standpoint of the durability of the asphalt pavement, and is preferably 230° C. or lower, more preferably 210° C. or lower, and further preferably 200° C. or lower, from the standpoint of the prevention of the thermal deterioration of the asphalt.

The mixing temperature of the aggregate and the asphalt composition is preferably 130° C. or higher, more preferably 150° C. or higher, and further preferably 170° C. or higher, from the standpoint of the durability of the asphalt pavement, and is preferably 230° C. or lower, more preferably 210° C. or lower, and further preferably 200° C. or lower, from the standpoint of the prevention of the thermal deterioration of the asphalt.

The mixing time of the aggregate and the asphalt composition is not particularly limited, is preferably 30 seconds or more, more preferably 1 minute or more, and further preferably 2 minutes or more, and is preferably 2 hours or less, more preferably 1 hour or less, and further preferably 30 minutes or less.

The production method of the asphalt mixture preferably includes, after mixing the aggregate and the asphalt composition, a step of retaining the resulting asphalt mixture at the mixing temperature or a temperature higher than the mixing temperature, from the standpoint of the durability of the asphalt pavement.

In the step of retaining the asphalt mixture, the mixture may be further mixed.

The retaining time is preferably 0.5 hour or more, more preferably 1 hour or more, and further preferably 1.5 hours or more, and the upper limit of the time is not particularly limited, and may be, for example, approximately 48 hours.

[Road Pavement Method]

The asphalt mixture is favorable for road pavement, and as described above, the asphalt mixture containing the asphalt composition having the aggregate added thereto is used for road pavement.

The road pavement method includes a step of laying the asphalt mixture on the road to form an asphalt pavement material layer. Specifically, the road pavement method may include a step of mixing the asphalt composition and the heated aggregate to provide the asphalt mixture (step 1), and a step of laying down the asphalt mixture obtained in the step 1 on the road to form an asphalt pavement material layer (step 2). The asphalt pavement material layer is preferably a base layer or a surface layer.

The asphalt mixture may be compacted with a known construction machine formation in a known method. The compacting temperature in the case where the heated asphalt mixture is used is preferably 100° C. or higher, more preferably 120° C. or higher, and further preferably 130° C. or higher, and is preferably 200° C. or lower, and more preferably 180° C. or lower, from the standpoint of the durability of the asphalt pavement.

EXAMPLES

In Production Examples, Examples, and Comparative Examples, the "part" and "%" mean "part by mass" and "% by mass" respectively unless otherwise indicated.

The properties of the polyester were measured and evaluated in the following manner.

(1) Acid Value of Polyester

The acid value of the polyester was measured according to the method of JIS K0070:1992, provided that the measurement solvent was changed from the mixed solvent of ethanol and ether defined in JIS K0070:1992 to a mixed solvent of acetone and toluene (acetone/toluene=1/1 (volume ratio)).

(2) Hydroxyl Value of Polyester

The hydroxyl value of the polyester was measured according to JIS K0070:1992, provided that the measurement solvent was changed from the mixed solvent of ethanol and ether defined in JIS K0070:1992 to tetrahydrofuran.

(3) Number Average Molecular Weight, Weight Average Molecular Weight, Peak Top Molecular Weight, and Polydispersity of Polyester The molecular weight distribution was measured by the gel permeation chromatography (GPC) method in the following manner, and the number average molecular weight (Mn), the weight average molecular weight (Mw), the peak top molecular weight (Mp), and the polydispersity (Mw/Mn) were obtained.

(i) Preparation of Specimen Solution

A specimen was dissolved in tetrahydrofuran at 60° C. to make a concentration of 0.5 g/100 mL. Thereafter, the solution was filtered with a PTFE type membrane filter having a pore diameter of 0.2 μm (DISMIC-25JP, available from Toyo Roshi Kaisha, Ltd.) to remove insoluble matters, to provide a specimen solution.

(ii) Measurement of Molecular Weight

With the measurement equipment and the columns described below, tetrahydrofuran as an eluent was flown therein at a flow rate of 1 mL/min to stabilize the columns in a thermostat chamber at 40° C. 100 μL of the specimen solution obtained in the item (i) was injected thereto to perform the measurement. The molecular weight of the specimen was calculated based on the calibration curve provided in advance. The calibration curve was prepared with several kinds of monodisperse polystyrene "A-500" ($5.0 \times 10^2$), "A-1000" ($1.01 \times 10^3$), "A-2500" ($2.63 \times 10^3$), "A-5000" ($5.97 \times 10^3$), "F-1" ($1.02 \times 10^3$), "F-2" ($1.81 \times 10^4$), "F-4" ($3.97 \times 10^4$), "F-10" ($9.64 \times 10^4$), "F-20" ($1.90 \times 10^5$), "F-40" ($4.27 \times 10^5$), "F-80" ($7.06 \times 10^5$), "F-128" ($1.09 \times 10^6$) (all available from Tosoh Corporation) as the standard specimen. The numeral in parentheses shows the molecular weight.

Measurement equipment: HLC-8320GPC (available from Tosoh Corporation)

Analysis columns: GMHXL+G3000HXL (available from Tosoh Corporation)

Production Examples 1 to 4 (Production of Polyesters (E-1) to (E-4))

The alcohol component, the carboxylic acid component, and the polymerization inhibitor shown in Table 1 were placed in a four-neck flask having a capacity of 10 L equipped with a stainless steel agitator, a dehydration tube, a nitrogen introducing tube, a thermometer and a thermocouple, and heated to 130° C., to which tin(II) di(2-ethylhexanoate) and gallic acid were then added in a nitrogen atmosphere, and the mixture was heated to 140° C. Thereafter, the mixture was heated to 210° C. over 7 hours and reacted at 210° C. and 8 kPa for 1 hour, so as to provide polyesters (E-1) to (E-4). The results are shown in Table 1.

Production Example 5 (Production of Polyester (C-1))

The alcohol component, the carboxylic acid component, and the polymerization inhibitor shown in Table 1 were placed in a four-neck flask having a capacity of 10 L equipped with, a stainless steel agitator, a dehydration tube, a nitrogen introducing tube, a thermometer and a thermocouple, and heated to 130° C., to which tin(II) di(2-ethylhexanoate) and gallic acid were then added in a nitrogen atmosphere, and the mixture was heated to 170° C. Thereafter, the mixture was heated up to 190° C. over 3 hours, reacted at 190° C. for 2 hours, and then reacted at 190° C. and 8 kPa for 3 hours, to provide polyester (C-1). The results are shown in Table 1.

Production Example 6 (Production of Polyester (C-2))

The alcohol component and the carboxylic acid component shown in Table 1 were placed in a four-neck flask having a capacity of 10 L equipped with a thermometer, a stainless steel agitator, a dehydration tube, a nitrogen introducing tube, and a thermocouple, and heated to 130° C., to which tin(II) di(2-ethylhexanoate) and gallic acid were then added in a nitrogen atmosphere, and the mixture was heated to 180° C. Thereafter, the mixture was heated to 210° C. over 3 hours, reacted at 210° C. for 3 hours, and then reacted at 210° C. and 8 kPa for 1.5 hours, to provide polyester (C-2). The results are shown in Table 1.

Production Example 7 (Production of Polyester (C-3))

The alcohol component, the carboxylic acid component, and the polymerization inhibitor shown in Table 1 were placed in a four-neck flask having a capacity of 10 L equipped with a stainless steel agitator, a dehydration tube, a nitrogen introducing tube, a thermometer and a thermocouple, and heated to 130° C., to which tin(II) di(2-ethylhexanoate) and gallic acid were then added in a nitrogen atmosphere, and the mixture was heated to 140° C. Thereafter, the mixture was heated up to 210° C. over 7 hours and reacted at 210° C. and 8 kPa for 1 hour, to provide polyester (C-3). The results are shown in Table 1.

TABLE 1

| | | | Production Example | | | | | | | | | | | | | | |
|---|---|---|---|---|---|---|---|---|---|---|---|---|---|---|---|---|---|
| | | | 1 | | 2 | | 3 | | 4 | | 5 | | 6 | | 7 | |
| Kind of polyester | | | E-1 | | E-2 | | E-3 | | E-4 | | C-1 | | C-2 | | C-3 | |
| Monomer composition | | | Charged amount (g) | Molar ratio *2 | Charged amount (g) | Molar ratio *2 | Charged amount (g) | Molar ratio *2 | Charged amount (g) | Molar ratio *2 | Charged amount (g) | Molar ratio *2 | Charged amount (g) | Molar ratio *2 | Charged amount (g) | Molar ratio *2 |
| Raw material monomer | Alcohol component | BAP-Po adduct *1 | 4,348 | 40 | 2,564 | 20 | 4,639 | 40 | 4,607 | 40 | 7,761 | 100 | | | 6,666 | 80 |
| | | Ethylene glycol | | | | | | | | | | | 1,048 | 40 | | |
| | | 1,6-Hexanediol | 1,953 | 60 | 3,072 | 80 | 2,084 | 60 | 2,070 | 60 | | | 2,991 | 60 | 499 | 20 |

TABLE 1-continued

| | | Production Example | | | | | | | | | | | | |
|---|---|---|---|---|---|---|---|---|---|---|---|---|---|
| | | 1 E-1 | | 2 E-2 | | 3 E-3 | | 4 E-4 | | 5 C-1 | | 6 C-2 | | 7 C-3 | |
| Kind of polyester | | | | | | | | | | | | | | | |
| Carboxylic acid component | Fumaric acid | 3,072 | 96 | 3,624 | 96 | 3,278 | 96 | 3,323 | 98 | 2,239 | 98 | | | 2,355 | 96 |
| | Stearic acid | 627 | 8 | 739 | 8 | | | | | | | | | 480 | 8 |
| | Terephthalic acid | | | | | | | | | | | 5,961 | 85 | | |
| Esterification catalyst | Tin(II) di(2-ethylhexanoate) (charged amount (g)) | 50 | | 50 | | 50 | | 50 | | 50 | | 50 | | 50 | |
| Promoter | Gallic acid (charged amount (g)) | 5 | | 5 | | 5 | | 5 | | 5 | | 5 | | 5 | |
| Polymerization inhibitor | 4-tert-Butylcatechol (charged amount (g)) | 2 | | 2 | | 2 | | 2 | | 2 | | | | 2 | |
| Properties | Acid value (mg KOH/g) | 17 | | 23 | | 10 | | 8 | | 17 | | 10 | | 16 | |
| | Hydroxyl value (mh KOH/g) | 21 | | 27 | | 31 | | 8 | | 20 | | 22 | | 20 | |
| | Number average molecular weight (Mn) | 2,700 | | 2,500 | | 3,600 | | 6,500 | | 3,000 | | 2,200 | | 2,800 | |
| | Weight average molecular weight (Mw) | 8,200 | | 8,300 | | 12,000 | | 47,000 | | 9,000 | | 9,900 | | 8,600 | |
| | Polydispersity (Mw/Mn) | 3.0 | | 3.3 | | 3.3 | | 7.2 | | 3.0 | | 4.5 | | 3.1 | |
| | Peak top molecular weight (Mp) | 5,800 | | 5,900 | | 10,600 | | 23,000 | | 6,900 | | 7,100 | | 6,900 | |

*1: BPA-Po adduct: Polyoxypropylene (2.8 mol) adduct of bisphenol A
*2: Molar amount with respect to 100 mol of alcohol component (molar ratio)

Example 1 (Asphalt Composition)

200 g of neat asphalt (Performance Grade (PG) 64-22, available from Associated Asphalt Inc., having an asphaltene content of 20.9% by mass) heated to 180° C. in advance was weighed in a 300 mL stainless steel beaker, to which 10 g of the polyester (E-1) obtained in Production Example 1 was added (5 parts by mass per 100 parts of the asphalt), and the mixture was agitated at 180° C. at an agitation speed of 400 rpm for 2 hours, so as to prepare an asphalt composition (AS-1).

Examples 2 to 4 and Comparative Examples 1 to 3

Asphalt compositions AS-2 to AS-4 and AS-C1 to AS-C3 were prepared in the same manner as in Example 1 except that the formulation was changed as shown in Table 2.

Comparative Example 4

An asphalt composition AS-C4 was prepared in the same manner as in Comparative Example 1 except that 0.25 g of a dispersant (Solsperse K240, available from Lubrizol Corporation) was added to the polyester (C-1).

[Evaluation]
[Storage Stability Test (Cigar Tube Test)]

The tendency of separation of the polyester in the asphalt composition was evaluated according to ASTM D7173. Specifically, 50 g of the resulting asphalt composition was poured in an aluminum tube having a diameter of 25 mm (Aluminum Tube, available from Geneq Inc.) set up vertically. The aluminum tube having the asphalt composition poured therein was sealed and allowed to stand vertically at 163° C. for 48 hours. Thereafter, the asphalt composition was solidified, vertically, at −10° C. for 4 hours.

The solidified specimen was cut along with the aluminum tube into three equal parts with an electric cutter. The center part of the specimen was discarded.

The upper part and the lower part of the specimen were separately liquefied by heating to 163° C., and each were measured for the softening point according to ASTM D36 with a softening point tester (Ring and Ball Herzog HRB 754, available from PAC L.P.). A smaller difference between the softening point of the lower part of the specimen and the softening point of the upper part of the specimen means better storage stability of the asphalt composition. The results are shown in Table 2.

TABLE 2

| Asphalt composition | Polyester Kind | Polyester Content (part by mass) *1 | Additive Kind | Additive Content (part by mass) *2 | Evaluation Softening point of upper part of specimen (°C.) | Evaluation Softening point of lower part of specimen (°C.) | Storage stability (2) *3 |
|---|---|---|---|---|---|---|---|
| Example 1 | AS-1 | E-1 | 3 | — | | 58.6 | 59.1 | 0.5 |
| Example 2 | AS-2 | E-2 | 3 | — | | 60.7 | 61.8 | 1.1 |
| Example 3 | AS-3 | E-3 | 3 | — | | 57.3 | 59.1 | 1.8 |
| Example 4 | AS-4 | E-4 | 3 | — | | 56.4 | 58.6 | 2.2 |
| Comparative Example 1 | AS-C1 | C-1 | 3 | — | | 55.4 | 58.9 | 3.5 |
| Comparative Example 2 | AS-C2 | C-2 | 3 | — | | 54.2 | 57.2 | 3.0 |
| Comparative Example 3 | AS-C3 | C-3 | 3 | — | | 55.4 | 58.9 | 3.5 |
| Comparative Example 4 | AS-C4 | C-1 | 3 | Solsperse K240 | 0.125 | 55.6 | 58.8 | 3.2 |

*1: Content per 100 parts by mass of asphalt (part by mass)
*2: Content per 100 parts by mass of asphalt (part by mass)
*3: Storage stability (2): (softening point of lower part of specimen)-(softening point of lower part of specimen) (°C.)

It is understood from the comparison between Examples and Comparative Examples that the asphalt compositions using the polyesters described in the Examples show excellent storage stability at a high temperature as compared to the asphalt compositions of Comparative Examples.

It is expected that by using the asphalt composition of the present invention for asphalt pavement, a paved material without strength unevenness can be obtained even after storing at a high temperature for a long period of time.

The invention claimed is:

1. An asphalt composition, comprising:
   asphalt; and
   a polyester;
   wherein:
   the polyester comprises a constitutional unit derived from an alcohol component and a constitutional unit derived from a carboxylic acid component;
   the alcohol component comprises:
      50% to 99% by mole of an aliphatic diol (A) having 4 to 12 carbon atoms; and
      1% by mole to less than 50% by mole of an alkylene oxide adduct of bisphenol A (B); and
   a molar ratio of the aliphatic diol (A) to the alkylene oxide adduct of bisphenol A (B) ((A)/(B)) in the alcohol component is 1.2 to 9.

2. The asphalt composition according to claim 1, wherein the polyester has a number average molecular weight of 1,500 to 8,000.

3. The asphalt composition according to claim 1, wherein the alcohol component further comprises 0.1% to 20% by mole of an aliphatic monoalcohol (C) having 12 to 22 carbon atoms.

4. The asphalt composition according to claim 3, wherein the aliphatic monoalcohol (C) has 16 to 20 carbon atoms.

5. The asphalt composition according to claim 1, wherein the carboxylic acid component comprises 0.1% to 20% by mole of an aliphatic monocarboxylic acid (D) having 12 to 22 carbon atoms.

6. The asphalt composition according to claim 5, wherein the aliphatic monocarboxylic acid (D) has 16 to 20 carbon atoms.

7. The asphalt composition according to claim 5, wherein the aliphatic monocarboxylic acid (D) is a saturated aliphatic monocarboxylic acid.

8. The asphalt composition according to claim 7, wherein the saturated aliphatic monocarboxylic acid is stearic acid.

9. The asphalt composition according to claim 1, wherein the polyester has a polydispersity Mw/Mn of 2.9 to 8.0.

10. The asphalt composition according to claim 1, wherein:
    the carboxylic acid component comprises at least one of fumaric acid and maleic acid; and
    a total amount of fumaric acid and maleic acid in the carboxylic acid component is 10% to 100% by mole.

11. The asphalt composition according to claim 1, wherein the polyester has a hydroxyl value of 10 mg to 50 mg KOH/g.

12. The asphalt composition according to claim 1, wherein the asphalt comprises 13% to 35% by mass of asphaltene.

* * * * *